Figure 1:
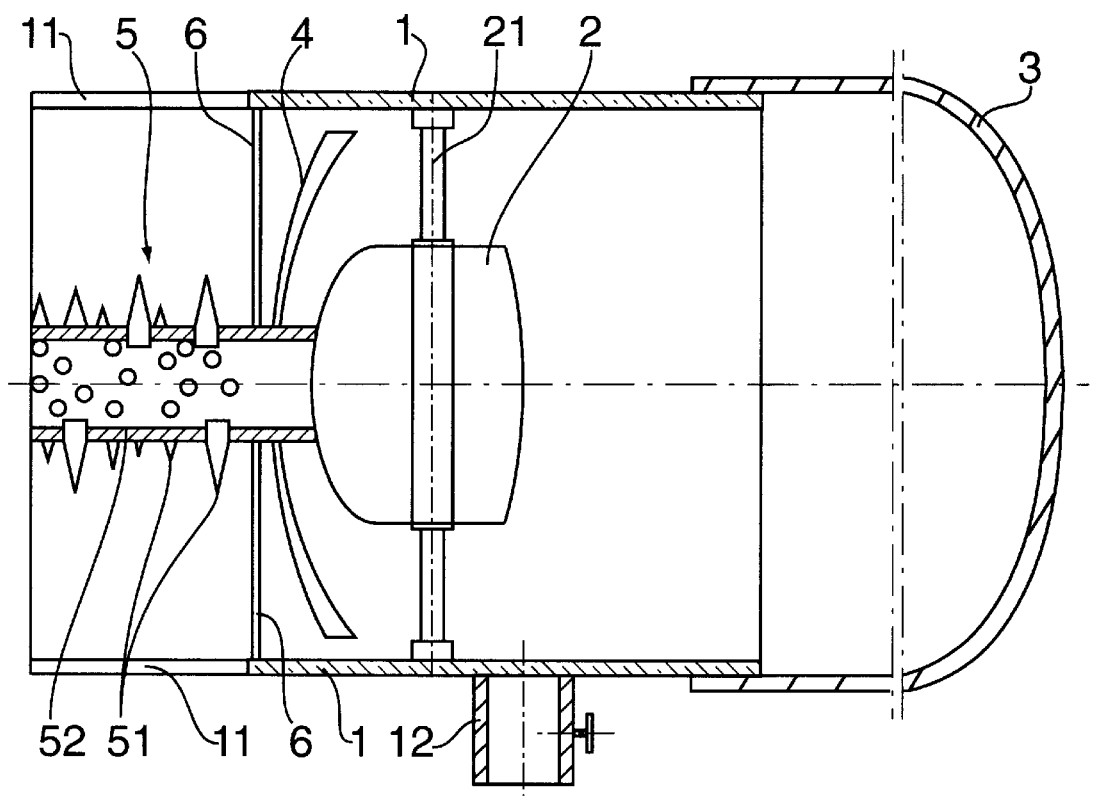

United States Patent

Elduayen et al.

[11] Patent Number: 5,863,245
[45] Date of Patent: Jan. 26, 1999

[54] FOWL-PLUCKING DEVICE

[76] Inventors: Angel Elduayen; Juan Andrés Elduayen, both of Ibaialdeko-Soroa, 4., 20150 Aduna - Gipuzkoa, Spain

[21] Appl. No.: 876,746

[22] Filed: Jun. 16, 1997

[30] Foreign Application Priority Data

Jun. 28, 1996 [ES] Spain ................................. 9601779 U

[51] Int. Cl.⁶ .................................................. A22C 21/02
[52] U.S. Cl. ................................. 452/88; 452/86; 452/91
[58] Field of Search ................................. 452/88, 87, 86, 452/91, 95

[56] References Cited

U.S. PATENT DOCUMENTS 5,135,430  8/1992  Jordan et al. ............................. 452/86

FOREIGN PATENT DOCUMENTS 765637  1/1957  United Kingdom ..................... 452/87

*Primary Examiner*—Willis Little
*Attorney, Agent, or Firm*—Bierman, Muserlian and Lucas

[57] ABSTRACT

Fowl-plucking device which is comprised of elastic tines arranged at different angles for the purpose of removing the feathers (plucking) the fowl and a fan which blows air for the purpose of projecting the feathers removed toward a disposable bag which collects the feathers and the user removes when he so deems suitable.

3 Claims, 2 Drawing Sheets

FOWL-PLUCKING DEVICE

This invention is that of a fowl-plucking device, particularly for plucking game fowl in situ, although not ruling out the use thereof for plucking any other type of fowl.

This is a simple device which combines three essential components in a manner heretofore unknown:

a) elastic tines arranged at different angles to remove the feathers from (pluck) the bird;

b) a fan which blows air to carry the feathers removed toward c) a disposable bag which collects the feathers and the user removes when he so deems suitable.

The device is so simple and economical that it can comprise a small household appliance.

For a better comprehension of the purpose of this invention, a preferred manner for the practical embodiment thereof, subject to additional changes which do not detract from the fundamentals thereof, is provided in the drawings.

FIG. 1 shows a general cross-sectional diagram of the fowl-plucking device as per the invention, indicating all of the components and specifics thereof shown in operating position, as a nonrestrictive example of the practical embodiment thereof.

Figure 2:
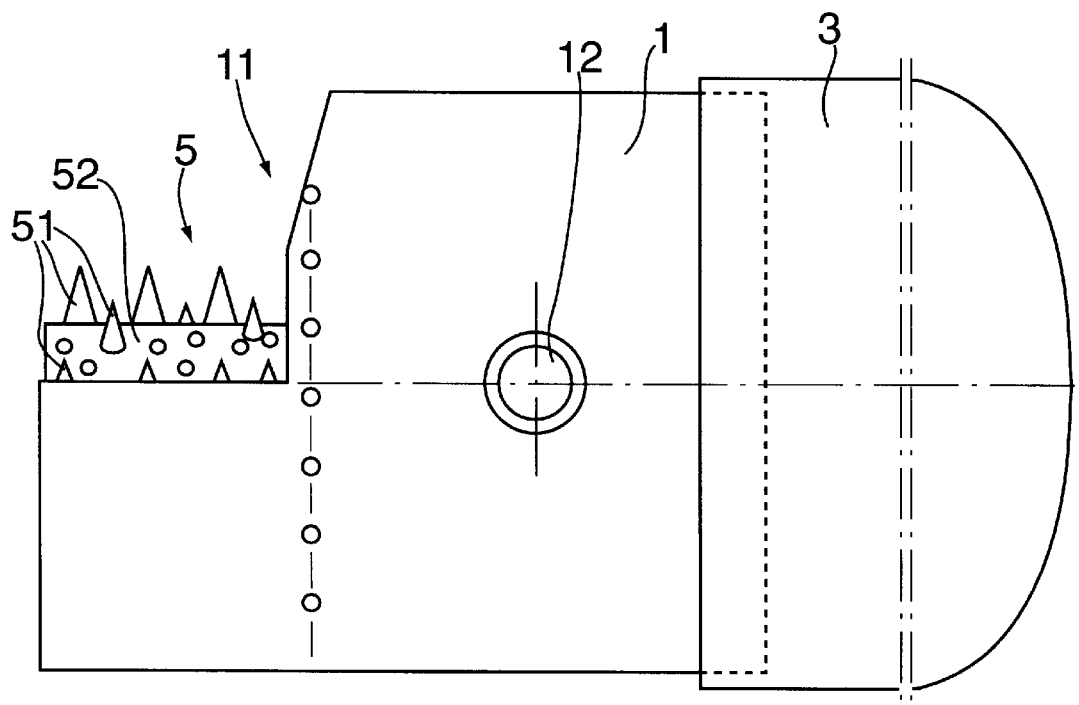

FIG. 2 provides a plan-view from below as per the preceding figure.

Figure 3:
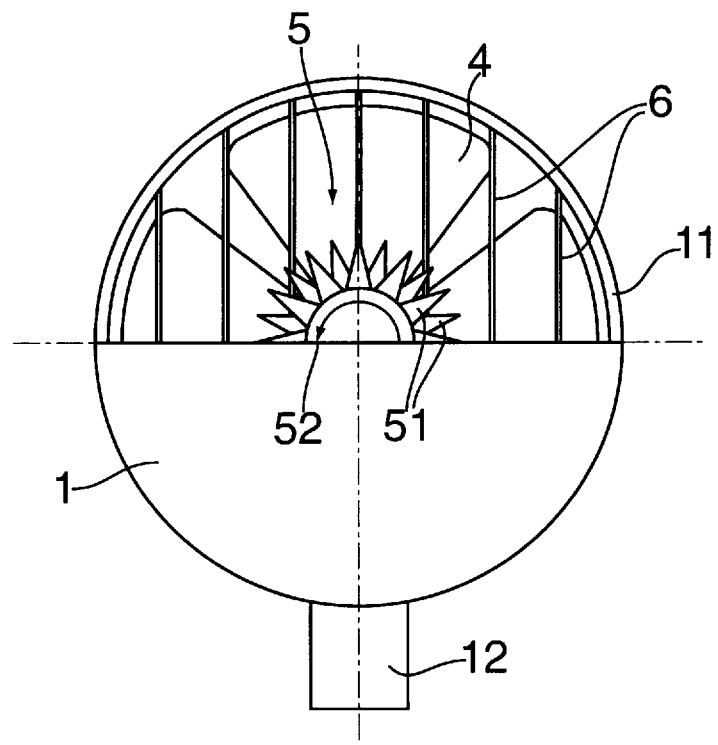

FIG. 3 provides a front view as per FIG. 2.

Figure 4:
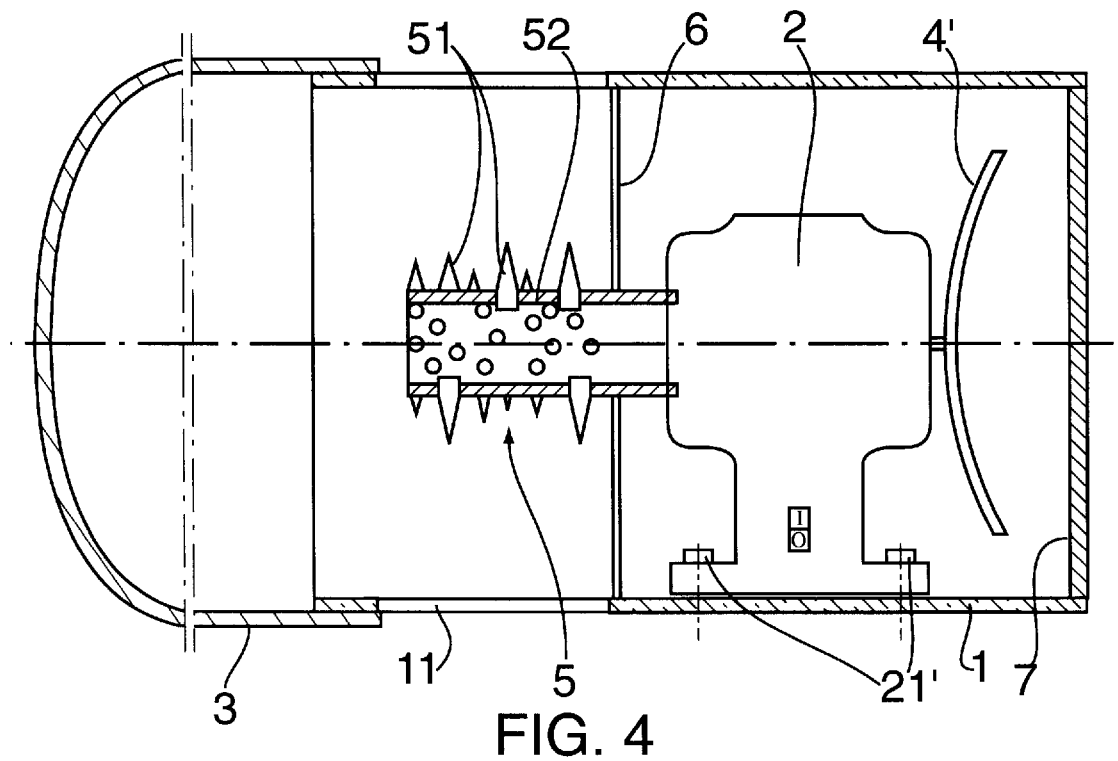

FIG. 4 provides a view similar to FIG. 1, showing an alternative positioning of the component parts of the device.

The fowl-plucking device is comprised of a body-casing (1), a plucking system comprised of a motor (2), plucking appliances (5) and air suction/exhaust appliances which can be fans (4), (4') (depending upon the direction in which the blades are angled) or equivalent component parts which project the feathers removed to a disposable bag for collection (3).

In accordance with the invention and according to the embodiment shown, the body-casing (1) is of a tubular configuration, with a semicircular window (11) to afford the possibility of inserting the bird into the plucking area (inside the body (1)).

The motor (2) is mounted inside the body-casing (1) by means of ties (21)—FIG. 1—or screws (21')—FIG. 4.

The plucking appliances (5) are a number of radial, elastically-deflectable tines (51) mounted at different angles on a tubular shaft (52) and coaxially affixed to the input shaft of the motor (2).

To prevent the accidental insertion of the bird into the area in which the motor (2) and fan (4) are situated, transversal rods (6) mounted spaced from one another are provided inside the body-casing (1).

In the example of the embodiment of the invention provided in FIG. 1, the collector bag (3) is situated on the side opposite the motor (2) where the plucking appliances (5) are situated. Thus, the fan (4) functions as an exhaust which sucks the feathers from the plucking area and projects them to the bag (3).

In the example of the embodiment of the invention provided in FIG. 4, the collector bag (3) is situated immediately behind the plucking appliances (5) and toward the same side as the motor (2). Thus, the fan (4') projects the feathers from the plucking area and projects them to the bag (3).

In this example of the embodiment of the invention, the fowl-plucking device is rounded out with a mesh (7) which prevents accidental access to the fan (4').

The support (12) joins the casing (1) to the pertinent fixed structure (not shown).

We claim:

1. A fowl-plucking device, particularly for game fowl, comprised of:

a) a body-casing (1) which is tubular in shape;

b) a disposable bar (3) positioned at one of the ends of said body-casing;

c) a plucking system mounted inside said body-casing (1), said plucking system comprised of a motor (2), plucking appliances (5), and a fan (4) (4') for the suction/blowing of air whereby the feathers plucked from the fowl are projected toward said bag (3), said plucking appliances (5) and said fan (4) (4') being coaxially mounted to said motor.

2. The fowl-plucking device of claim 1 wherein said plucking appliances (5) are a number of radial, elastically-deflectable tines (51) mounted at different angles on a shaft (52) coaxial with the input shaft of the motor (2).

3. The fowl-plucking device of claim 1, further comprising transversal rods (6) mounted spaced from one another inside the body-casing (1) proper and situated between the plucking appliances (5) and the fan (4), (4').

* * * * *